United States Patent
Wang et al.

(10) Patent No.: US 9,208,017 B2
(45) Date of Patent: Dec. 8, 2015

(54) SERVER AND METHOD FOR PROTECTING AGAINST FAN FAILURE THEREIN

(71) Applicant: HON HAI PRECISION INDUSTRY CO., LTD., New Taipei (TW)

(72) Inventors: Hsin-Fu Wang, New Taipei (TW); Kuan-Hsiang Chao, New Taipei (TW)

(73) Assignees: Patentcloud Corporation, Shenzhen (CN); Patentcloud Co. Limited, Kwun Tong (HK)

( * ) Notice: Subject to any disclaimer, the term of this patent is extended or adjusted under 35 U.S.C. 154(b) by 181 days.

(21) Appl. No.: 14/140,549

(22) Filed: Dec. 26, 2013

(65) Prior Publication Data

US 2014/0181583 A1    Jun. 26, 2014

(30) Foreign Application Priority Data

Dec. 26, 2012 (TW) .............................. 101149977 A

(51) Int. Cl.
| | | |
|---|---|---|
| *G06F 11/00* | (2006.01) | |
| *G06F 11/07* | (2006.01) | |
| *G06F 11/30* | (2006.01) | |

(52) U.S. Cl.
CPC ........ *G06F 11/0793* (2013.01); *G06F 11/0706* (2013.01); *G06F 11/0757* (2013.01); *G06F 11/3058* (2013.01)

(58) Field of Classification Search
CPC ............ G06F 11/0706; G06F 11/0757; G06F 11/0793; G06F 11/3058
See application file for complete search history.

(56) References Cited

U.S. PATENT DOCUMENTS

| | | | |
|---|---|---|---|
| 5,761,085 A * | 6/1998 | Giorgio | 702/33 |
| 2003/0189496 A1 * | 10/2003 | Tran | 340/870.07 |
| 2006/0036879 A1 * | 2/2006 | Wahler et al. | 713/300 |
| 2006/0143519 A1 * | 6/2006 | Maier et al. | 714/25 |
| 2006/0176186 A1 * | 8/2006 | Larson et al. | 340/635 |
| 2010/0094593 A1 * | 4/2010 | Reddy et al. | 702/183 |
| 2013/0156576 A1 * | 6/2013 | Warren et al. | 416/1 |

\* cited by examiner

*Primary Examiner* — Joshua P Lottich
(74) *Attorney, Agent, or Firm* — Novak Druce Connolly Bove + Quigg LLP

(57) ABSTRACT

A method for protecting against fan failure in a server uses a storage unit and a plurality of fans in the server. The method includes the following steps. A rotation speed of each of the plurality of fans is detected. A continuous working time period of each fan is timed. The rotation speed reading and the continuous working time period reading of each fan is compared with predefined rotation speed values and predefined continuous working time periods stored in the storage unit. The results of comparisons are made. A countdown is started when any of the results of comparison falls into one of predefined failure conditions for the fans. Unless a renew or other countdown-amending signal is received, the server is counted down to zero and then shut down. A server equipped to be able to carry out the protecting method is also provided.

10 Claims, 3 Drawing Sheets

SERVER AND METHOD FOR PROTECTING AGAINST FAN FAILURE THEREIN

BACKGROUND

1. Technical Field

The present disclosure relates to servers and methods for protecting against fan failure inside servers.

2. Description of Related Art

A baseboard management controller (BMC) detects the working status of a server to determine whether the status is normal. When the BMC determines that the status is abnormal, the BMC activates an alarm. However, a conventional BMC cannot take emergency measures to prevent or reduce damage when the status is abnormal.

Therefore, what is needed is a server and a method for protecting against fan failure in the server, which can alleviate or even overcome the limitations described above.

BRIEF DESCRIPTION OF THE DRAWINGS

The emphasis is placed upon clearly illustrating the principles of the present disclosure.

DETAILED DESCRIPTION

Figure 1:
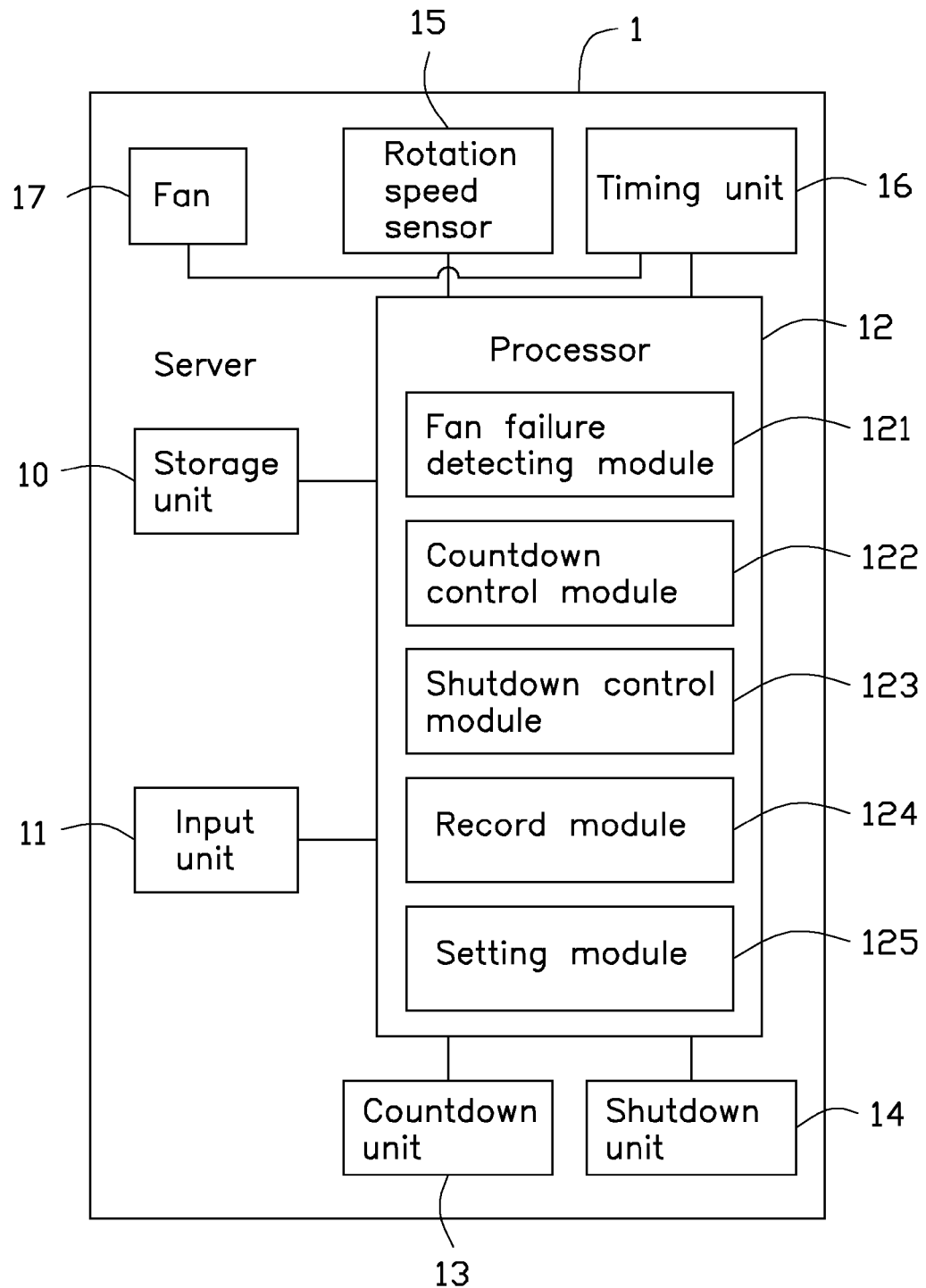
FIG. 1 is a block diagram of a server in accordance with an embodiment of the present invention.

FIG. 1 shows a server 1 in accordance with an embodiment. The server 1 includes a storage unit 10, a processor 12, a countdown unit 13, and a shutdown unit 14. The server 1 further includes a number of fans 17 (only one shown) for heat dissipation from the server 1. The fans 17 may be rotary fans, for example.

The storage unit 10 is configured for storing a predefined (threshold) rotation speed for each fan 17, and a predefined (threshold) continuous working time period for each fan 17. The storage unit 10 is further configured for storing a number of predefined failure conditions of the fans 17, and a countdown time period for counting down from the time a failure condition arises to the time when a preventive action is automatically initiated. All the above-described data is stored in the storage unit 10 in advance, i.e., pre-stored.

The server 1 further includes a number of rotation speed sensors 15 (only one shown). Each rotation speed sensor 15 detects a rotation speed of one fan 17, generates a rotation speed signal, and transmits the rotation speed signal to the processor 12.

The server 1 further includes a number of timing units 16 (only one shown).

Each timing unit 16 times a continuous working time period of one fan 17, periodically generates a time signal, and transmits the time signal to the processor 12. The timing unit 16 is a timer or a device having a function of counting time.

The processor 12 includes a fan failure detecting module 121, a countdown control module 122, and a shutdown control module 123.

The fan failure detecting module 121 receives the rotation speed signals and the time signals, and in response compares values (or readings) of the rotation speed signals and values (or readings) of the time signals with corresponding values of the predefined rotation speeds and corresponding values of the predefined continuous working time periods stored in the storage unit 10. The fan failure detecting module 121 also generates results of the comparisons, and determines whether any of the results (whether alone or in combination) fall into any one or more of the predefined failure conditions for the fans 17. The fan failure detecting module 121 further generates a start countdown signal when it is determined that any one or more of the results fall into any one or more of the predefined failure conditions for the fans 17.

In this embodiment, the predefined failure conditions for the fans 17 includes three predefined conditions: first, there is at least one fan 17 whose rotation speed and continuous working time period are both unknown because the fan failure detecting module 121 is not receiving rotation speed signals and time signals for that fan(s) 17; second, the rotation speed readings of at least two fans 17 are less than the corresponding predefined rotation speed values; and third, the reading of the rotation speed of every fan 17 is greater than the corresponding value of the predefined rotation speed, and the reading of the continuous working time period of every fan 17 is greater than the corresponding value of the predefined continuous working time period. In another embodiment, the predefined failure conditions for the fans 17 can be set by a user.

The countdown control module 122 obtains the countdown time period stored in the storage unit 10 in response to the start countdown signal, controls the countdown unit 13 to start a corresponding countdown when the start countdown signal is received, and generates a shutdown signal when the countdown unit 13 has counted down to zero.

The shutdown control module 123 controls the shutdown unit 14 to shut down the server 1, in response to the shutdown signal.

In this embodiment, the processor 12 further includes a record module 124. The record module 124 records the fan failure information in response to the start countdown signal, and stores the recorded fan failure information in the storage unit 10.

In this embodiment, the server 1 further includes an input unit 11, and the processor 12 further includes a setting module 125. The setting module 125 is configured for setting a predefined rotation speed and a predefined continuous working time period for each fan 17 in response to a user's operations applied on the input unit 11, and for storing the predefined rotation speeds and predefined continuous working time periods in the storage unit 10.

In another embodiment, during the countdown by the countdown unit 13, the input unit 11 can generate a signal to amend the countdown time period. Such signal is generated in response to an operation, such as a manual operation applied on the input unit 11 by a user wanting to amend the countdown time period. The countdown control module 122 amends the duration of the countdown time period when there is a signal to amend the countdown time period, and controls the countdown unit 13 to continue counting albeit according to the amended countdown time period.

In other embodiments, during the countdown by the countdown unit 13, the input unit 11 can generate a shutdown signal. Such signal is generated in response to an operation, such as a manual operation applied on the input unit 11 by a user wanting to impose an immediate shutdown. The shutdown control module 123 controls the server 1 to shut down directly when there is a shutdown signal.

In another embodiment, after the countdown unit 13 counts down to zero according to the countdown time period, the fan failure detecting module 121 performs up-to-date comparisons of the rotation speed readings and continuous working time period readings with the corresponding values of the predefined rotation speeds and the corresponding values of the predefined continuous working time periods stored in the storage unit 10. According to the up-to-date comparison results, the fan failure detecting module 121 determines whether any of the up-to-date comparison results (whether alone or in combination) fall into any one or more of the predefined failure conditions for the fans 17. The shutdown control module 123 controls the shutdown unit 14 to shut down the server 1 when any one or more of the up-to-date comparison results fall into any one or more of the predefined failure conditions for the fans 17. If none of the up-to-date comparison results fall into any one or more of the predefined failure conditions for the fans 17, the server 1 is not shut down.

Figure 2A:
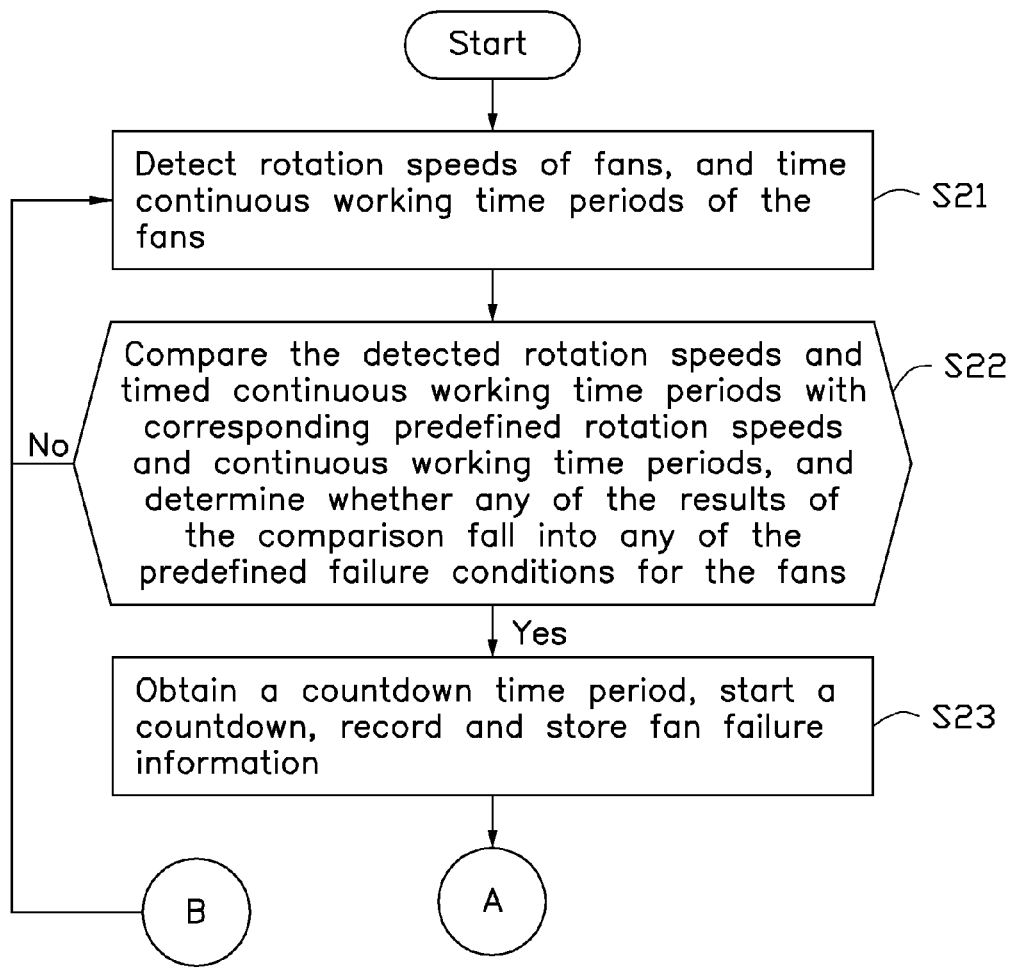
FIGS. 2A and 2B together constitute a single flowchart of a method for protecting against fan failure in a server, such as the one of FIG. 1, in accordance with an embodiment of the present invention.
Figure 2B:
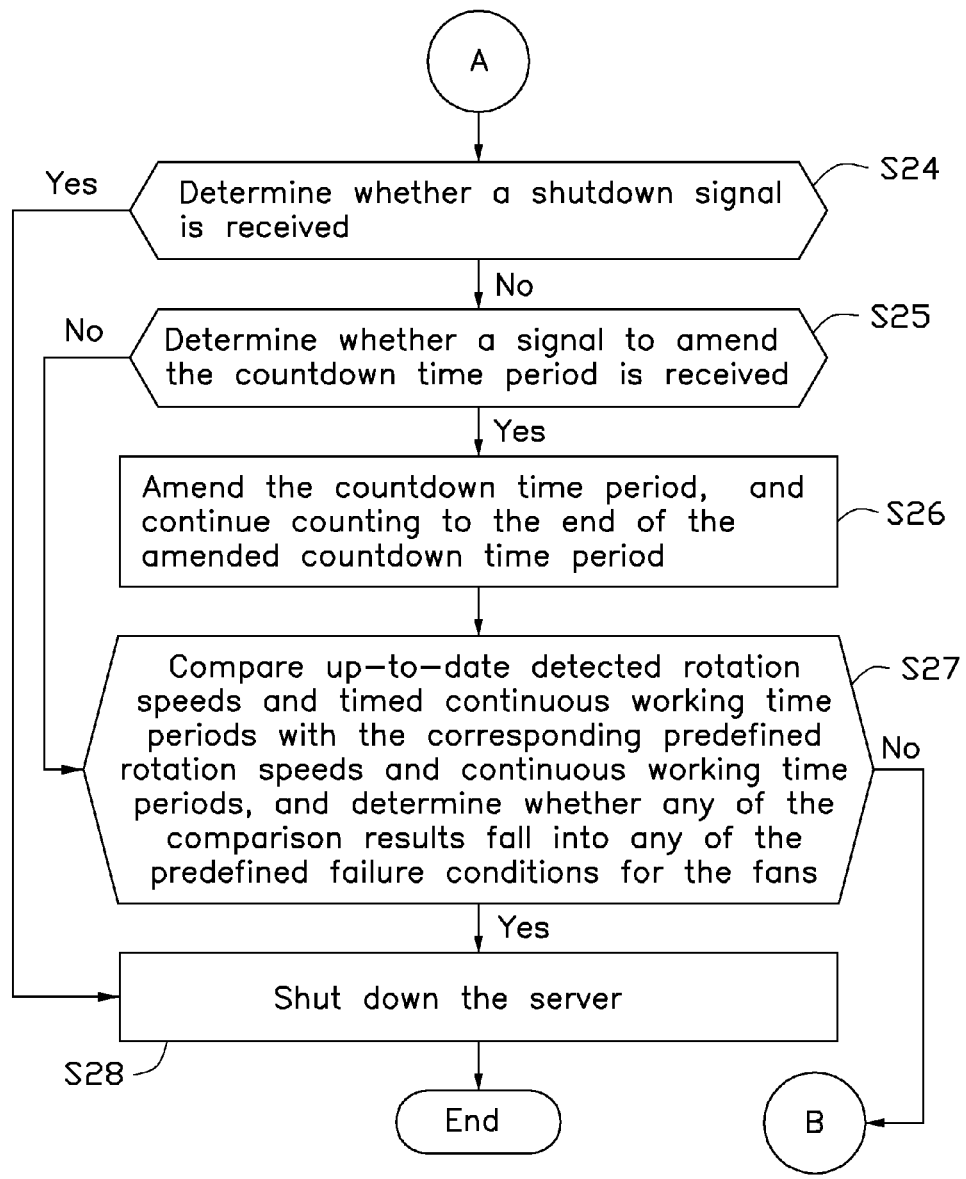

FIGS. 2A and 2B together constitute a single flowchart of a method for protecting against fan failure for a server, such as the server 1, in accordance with an embodiment. The server 1 includes a storage unit 10 and an input unit 11. The storage unit 10 stores both a number of predefined rotation speeds and a number of predefined continuous working time periods for the fans 17. The storage unit 10 also stores a number of predefined failure conditions for the fans 17 and a countdown time period.

In step S21, the server 1 includes a number of rotation speed sensors 15 and a number of timing units 16. Each rotation speed sensor 15 detects a rotation speed of one fan 17, and each timing unit 16 times a continuous working time period of one fan 17.

In step S22, the fan failure detecting module 121 compares the detected rotation speeds and the timed continuous working time periods with corresponding predefined rotation speeds and predefined continuous working time periods stored in the storage unit 10, and determines whether any of the comparison results fall into any of the predefined failure conditions for the fans 17. If the determination is yes, the process goes to step S23. Otherwise, the process goes back to step S21.

In step S23, the countdown control module 122 obtains the countdown time period for counting down which is stored in the storage unit 10, and controls the countdown unit 13 to start a countdown accordingly. The record module 124 records the fan failure information, and stores the recorded fan failure information in the storage unit 10.

In step S24, the shutdown control module 123 determines whether a shutdown signal is received. If the determination is no, the process goes to step S25. Otherwise, the process goes to step S28.

In step S25, the countdown control module 122 determines whether a signal to amend the countdown time period for counting down is received. If the determination is yes, the process goes to step S26. Otherwise, the process goes to step S27.

In step S26, the countdown control module 122 amends the countdown time period for counting down, and controls the countdown unit 13 to continue counting to the end of the amended countdown time period.

In step S27, after the countdown unit 13 counts down to zero according to the applicable countdown time period, the fan failure detecting module 121 compares up-to-date detected rotation speeds and up-to-date timed continuous working time periods with the corresponding predefined rotation speeds and predefined continuous working time periods stored in the storage unit 10, and determines whether any of the comparison results fall into any of the predefined failure conditions for the fans 17. If the determination is yes, the process goes to step S28. Otherwise, the process goes back to step S21.

In step S28, the shutdown control module 123 controls the shutdown unit 14 to shut down the server 1.

Although the present disclosure has been specifically described on the basis of various embodiments thereof, the disclosure is not to be construed as being limited thereto. Various changes or modifications may be made to the embodiments without departing from the scope and spirit of the disclosure.

What is claimed is:

1. A method for protecting a server against fan failure, the server comprising a storage unit and a plurality of fans, the method comprising:
   detecting a rotation speed of each of the fans and timing a continuous working time period of each of the fans;
   comparing the detected rotation speed and the timed continuous working time period of each fan with a corresponding predefined rotation speed and a corresponding predefined continuous working time period stored in the storage unit, generating results of the comparisons, and determining whether any of the results for any one or more of the fans fall into one or more predefined failure conditions for the fans stored in the storage unit;
   obtaining a countdown time period stored in the storage unit and starting a countdown based on the countdown time period when any of the results for any one or more of the fans fall into one or more predefined failure conditions for the fans; and
   shutting down the server when the countdown reaches zero.

2. The method as described in claim 1, further comprising:
   determining whether a shutdown signal is received; and
   shutting down the server when the shutdown signal is received.

3. The method as described in claim 1, further comprising:
   determining whether a signal to amend the countdown time period is received;
   amending the countdown time period to a new countdown time period when the signal to amend the countdown time period is received; and
   continuing the countdown according to the amended countdown time period.

4. The method as described in claim 1, wherein shutting down the server when the countdown reaches zero is performed only after the following actions are performed at the time the countdown reaches zero:
   repeating detecting a rotation speed of each of the fans and timing a continuous working time period of each of the fans; and
   comparing the up-to-date detected rotation speed and the up-to-date timed continuous working time period of each fan with the corresponding predefined rotation speed and the corresponding predefined continuous working time period, generating results of the comparisons, and determining that any of the results for any one or more of the fans fall into the one or more predefined failure conditions for the fans.

5. The method as described in claim 1, further comprising:
   recording fan failure information and storing the recorded fan failure information in the storage unit when any of the results for any one or more of the fans fall into one or more predefined failure conditions for the fans.

6. A server, comprising:
   a plurality of fans;
   a storage unit;
   a plurality of rotation speed sensors, configured for detecting rotation speeds of the plurality of fans;

a plurality of timing units, configured for timing continuous working time periods of the plurality of fans;

a fan failure detecting module, configured for comparing the detected rotation speed and the timed continuous working time period of each fan with a corresponding predefined rotation speed and a corresponding predefined continuous working time period, generating results of the comparisons, and determining whether any of the results for any one or more of the fans fall into one or more predefined failure conditions stored in the storage unit;

a countdown unit;

a countdown control module, configured for obtaining a countdown time period stored in the storage unit and controlling the countdown unit to start a countdown based on the countdown time period when any of the results for any one or more of the fans fall into one or more predefined failure conditions;

a shutdown unit; and a shutdown control module, configured for controlling the shutdown unit to shut down the server when the countdown reaches zero.

7. The server as described in claim 6, wherein the shutdown control module is further configured for controlling the server to shut down directly in response to a shutdown signal that is received anytime during the countdown unit counting down.

8. The server as described in claim 6, wherein the countdown control module is further configured for amending the countdown time period in response to a signal to amend the countdown time period and controlling the countdown unit to continue an ongoing countdown according to the amended countdown time period.

9. The server as described in claim 6, wherein the fan failure detecting module is configured for, at the time the countdown reaches zero, repeating detecting a rotation speed of each of the fans and timing a continuous working time period of each of the fans, comparing the up-to-date detected rotation speed and the up-to-date timed continuous working time period of each fan with the corresponding predefined rotation speed and the corresponding predefined continuous working time period, generating results of the comparisons, determining whether any of the results for any one or more of the fans fall into the one or more predefined failure conditions for the fans, and controlling the shutdown unit to shut down the server only when any of the results for any one or more of the fans fall into the one or more predefined failure conditions for the fans.

10. The server as described in claim 6, further comprising a record module; wherein the fan failure detecting module is further configured for generating a start countdown signal when it is determined that any one or more of the results fall into any one or more of the predefined failure conditions for the fans; and the record module is configured for, in response to the start countdown signal, recording fan failure information and storing the recorded fan failure information in the storage unit.

* * * * *